(12) United States Patent
Shi et al.

(10) Patent No.: US 8,837,284 B2
(45) Date of Patent: Sep. 16, 2014

(54) METHOD FOR SCHEDULING GUARANTEED BIT RATE SERVICE BASED ON QUALITY OF SERVICE

(75) Inventors: Xianwen Shi, Shenzhen (CN); Yong Yu, Shenzhen (CN); Tao Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 158 days.

(21) Appl. No.: 13/579,944

(22) PCT Filed: May 20, 2010

(86) PCT No.: PCT/CN2010/073023
§ 371 (c)(1),
(2), (4) Date: Aug. 19, 2012

(87) PCT Pub. No.: WO2011/143824
PCT Pub. Date: Nov. 24, 2011

(65) Prior Publication Data
US 2012/0320745 A1  Dec. 20, 2012

(51) Int. Cl.
H04L 1/00 (2006.01)
H04B 7/216 (2006.01)
H04W 4/00 (2009.01)
H04L 12/927 (2013.01)
H04W 72/12 (2009.01)

(52) U.S. Cl.
CPC ......... *H04W 72/1247* (2013.01); *H04L 47/805* (2013.01); *H04L 47/801* (2013.01)
USPC ........... 370/230; 370/235; 370/237; 370/328; 370/335

(58) Field of Classification Search
CPC ... H04L 47/805; H04L 12/5695; H04L 1/001; H04L 1/0019; H04W 72/1242
USPC ....................................................... 370/230
See application file for complete search history.

(56) References Cited

U.S. PATENT DOCUMENTS

2007/0115813 A1   5/2007   Hyon et al.
2008/0170504 A1   7/2008   Petrovic
(Continued)

FOREIGN PATENT DOCUMENTS

CN   101060474 A   10/2007
CN   101540716 A   9/2009
(Continued)

OTHER PUBLICATIONS

M. Anas, C. Rose, F. D. Calabrese, K. I. Pederson, and P. E. Mogensen, "Combined Admission Control and Scheduling for QOS Differentation in LTE uplink," in Proceedings of the 68th Semi-Annual IEEE Vehicular Technology (VTC '08), Sep. 2008.*

(Continued)

*Primary Examiner* — Alpus H Hsu
*Assistant Examiner* — Elton Williams
(74) *Attorney, Agent, or Firm* — Oppedahl Patent Law Firm LLC

(57) ABSTRACT

The disclosure discloses a method for scheduling a Guaranteed Bit Rate (GBR) service based on Quality of Service (QoS) and an apparatus implementing the method, wherein the method comprises the steps of: determining a scheduling priority of an online user according to an average rate of a GBR service of the user in a current Transmission Time Interval (TTI); and scheduling the user in accordance with the determined priority and allocating Resource Block (RB) resources to the user. With the scheduling method of the disclosure, the RB resource can be fully utilized, and the user rate which does not reach the GBR is quickly improved to make as many users as possible to reach the GBR, so as to increase the number of satisfied users in system. For the case in which a Maximum Bit Rate (MBR) is greater than the GBR, on the basis that as many users as possible are made to reach the GBR, the rates of the users can be further improved to increase the number of users with high rates.

12 Claims, 6 Drawing Sheets

(56) References Cited

U.S. PATENT DOCUMENTS

2009/0168793 A1 7/2009 Fox et al.
2013/0012221 A1* 1/2013 Zou et al. ................... 455/452.1

FOREIGN PATENT DOCUMENTS

| CN | 101572596 A | 11/2009 |
|---|---|---|
| CN | 101600231 A | 12/2009 |
| JP | 2007151158 A | 6/2007 |
| JP | 2009518904 A | 5/2009 |
| JP | 2011525065 A | 9/2011 |
| JP | 5395982 B2 | 1/2014 |
| RU | 2305371 C2 | 8/2007 |

OTHER PUBLICATIONS

English translation of CN101060474A.*

International Search Report in international application No. PCT/CN2010/073023, mailed on Feb. 24, 2011.

English Translation of the Written Opinion of the International Search Authority in international application No. PCT/CN2010/073023, mailed on Feb. 24, 2011.

M. Anas et al., "Combined Admission Control and Scheduling for QoS Differentiation in LTE Uplink," Sep. 2008. (5 pages).

* cited by examiner

METHOD FOR SCHEDULING GUARANTEED BIT RATE SERVICE BASED ON QUALITY OF SERVICE

TECHNICAL FIELD

The disclosure relates to a scheduling technology of a Guaranteed Bit Rate (GBR) service, in particular to a method for scheduling a GBR service based on Quality of Service (QoS).

BACKGROUND

Data with a strict QoS guarantee, such as voice, image, video and other multimedia service data, is a major concern for a mobile communication system. In order to enable a service to be used by a terminal user with an expected effect, for example, the images should be continuous when a user watches a Video online, the $3^{rd}$ Generation Partnership Project (3GPP) clearly defines an end-to-end QoS structure in the mobile communication system and introduces multiple bearing and processing mechanisms, to guarantee that the mobile communication system can fully develop its technical advantages for providing various differentiated services for users.

QoS refers to the service quality provided by a system (server) for a user. QoS is for end to end, that is, the evaluation of QoS starts from a Source end and ends at a Target end. QoS parameters of bearer level include QoS Class Identifier (QCI), Allocation and Retention Priority (ARP), GBR, Maximum Bit Rate (MBR) and Aggregated Maximum Bit Rate (AMBR), wherein the QCI is a quantity level used for representing parameters of an access point transmitted and processed by a data packet for controlling the bearer level, and the main object of the ARP is to decide whether to accept or reject a bearer establishment or modification request in the case of limited resources. The parameter GBR represents a bit rate expected to be provided by a GBR bearer, when a transmission rate of a service is greater than or equal to the GBR, the QoS of the service is satisfied; when the transmission rate of the service is less than the GBR, the QoS of the service is not acceptable. The parameter MBR limits the bit rate which the GBR bearer can provide and represents an upper limit of the data rate expected to be provided by the GBR bearer.

The GBR bearer is mainly used for services such as voice, video, real-time game, and etc.; however, in order to guarantee the QoS of a service, it is needed to guarantee the QoS at access network side and the QoS at core network side. The QoS of the core network side service is guaranteed by a transmission priority, while the QoS of the access network side is guaranteed by allocating sufficient radio resources in a Base Station.

The QoS of the core network side service is easily implemented. However, for the QoS of a GBR service of the access network, the eNodeB decides the service priority of each user terminal through scheduling; therefore, the selection of a proper scheduling algorithm plays an important role on the obtaining of a GBR rate of a user terminal.

At present, there are three common scheduling algorithms at the base station side: Round Robin (RR) algorithm, Maximum Carrier to Interference (Max C/I) algorithm, and Proportional Fair (PF) algorithm.

The basic idea of the RR algorithm is to guarantee that user terminals in a cell occupy equal time of radio resources cyclically based on a determined order to perform communication. Although this algorithm provides fairest scheduling chances, it can not fully utilize the differentiation in the quality of user channels, both the system resource utilization ratio and the system throughput are very low. Besides, this algorithm does not consider the requirement of the user's GBR, thus the user's satisfaction degree is very low.

The basic idea of the Max C/I algorithm is to sort all prediction values of Channel Quality Indicator (CQI) of users and to schedule the users in a descending order. Although this algorithm can obtain a maximum system throughput rate, the service obtained by the user is not fair: a center user with good channel conditions would accept services all the time and the rate thereof would be greater than the GBR, while an edge user with poor channel conditions has a rate less than the GBR because of failing to obtain scheduling, thus the user's satisfaction degree is low.

The PF algorithm is that the eNodeB schedules one or more terminals having greatest Fair Factors (FF). The basic idea of the PF algorithm is to allocate corresponding priorities to users in a cell, wherein the user with the highest priority in the cell accepts services. The sector throughput rate and the service fairness of this algorithm are between the RR algorithm and the Max C/I algorithm.

$$FairFactor_i(t) = \frac{TbSize_i(t)}{Throughput_i(t)+1},$$

wherein $FairFactor_i(t)$ represents a FF of $UE_i$ at moment t; $TbSize_i(t)$ represents a data amount $UE_i$ can transmit at moment t; $Throughput_i(t)$ represents the throughput of $UE_i$ in a time window with t as its end. For a User Equipment (UE) with good CQI, with its increase of the throughput, the priority would decrease to achieve fairness. This algorithm does not consider the requirement of the user's GBR either.

If a service in a communication system is of stream type, the service needs a GBR. If a service is a non-GBR service and the GBR is not configured for the user, then no service is provided for the user when the system lacks resources, which results in the user not satisfied. Therefore, a proper GBR is needed to be configured for a user both in a GBR service and a non-GBR service, so that the user can obtain a basic QoS. In this way, extensive operation policies can be provided.

SUMMARY

In view of the problem above, the main object of the disclosure is to provide a method and apparatus for scheduling a GBR service based on QoS, so that Resource Block (RB) resources can be fully utilized, and the user rate which does not reach a GBR is quickly improved to make as many users as possible to reach the GBR rate.

In order to achieve the object above, the technical scheme of the disclosure is realized by:

A method for scheduling a GBR service based on QoS, and the method includes:

a scheduling priority of an online user is determined according to an average rate of a GBR service of the user in a current Transmission Time Interval (TTI); and the user is scheduled in accordance with the determined priority and RB resources is allocated to the user.

Preferably, determining the scheduling priority of the online user according to the average rate of the GBR service of the user in the current TTI may be:

the scheduling priority of the user is determined according to a PF scheduling algorithm in conjunction with QoS of the GBR service of the user.

Preferably, determining the scheduling priority of the user according to the PF scheduling algorithm in conjunction with QoS of the GBR service of the user may be determining a scheduling priority FF of the user according to the following formula:

$$FF = FF_{PF} \cdot FF_{GBR}$$

where $$FF_{PF} = \frac{\sum_{i=1}^{N} TB(i)}{1 + Th_{His}}, \quad FF_{GBR} = e^{\frac{GBR \cdot (1 + ThresholdGBR)}{1 + Th_{His}}},$$

"·" represents a scalar multiplication, $Th_{His}$ represents an average rate of the GBR service in N TTIs selected prior to the current TTI, TB(i) represents Transmission Blocks (TBs) transmitted successfully in the N TTIs, ThresholdGBR represents a GBR reserved proportion set by a system, and GBR in the numerator of the index represents a guaranteed bit rate configured by the system.

Preferably, $Th_{His}$ is determined according to the following formula:

$$Th_{His} = \frac{\sum_{i=1}^{N}(TB\_1 \cdot ACK\_1 + TB\_2 \cdot ACK\_2 + \ldots + TB\_m \cdot ACK\_m)}{N},$$

where N represents a selected window length, m represents a number of GBR service streams of the user in the N TTIs, TB_1 to TB_m represent TB Sizes scheduled once for respective GBR service streams 1 to m in the TTI, and ACK_1, ACK_2 and ACK_m take a value of 1 when a corresponding TB is transmitted successfully and a value of 0 when the corresponding TB fails to be transmitted.

Preferably, scheduling the user in accordance with the determined priority and allocating RB resources to the user may be:

retransmission users are scheduled in accordance with a priority order, wherein a number of RBs of each retransmission user depends on a retransmitted TB Size and is not limited by a GBR factor; and if there are remaining RB resources after all retransmission users are scheduled, new-transmission users are scheduled in accordance with a priority order, and multiple RBs are allocated to each new-transmission user according to QoS determined by the GBR service of each new-transmission user.

Preferably, allocating multiple RBs to each new-transmission user according to the QoS determined by the GBR service of each new-transmission user may be:

when determining that the average rate of the new-transmission user is greater than a Maximum Bit Rate (MBR), the new-transmission user is not scheduled;

when determining that the average rate of the new-transmission user is greater than or equal to the GBR but less than or equal to the MBR and further determining that there are other users with rates less than the GBR in a current cell, a number of RBs for the new-transmission user is determined according to a smaller value in the GBR and a Buffer Status Report (BSR) of the new-transmission user; when determining that the average rates of other users in the current cell are all greater than or equal to the GBR, a number of RBs for the new-transmission user is determined according to the value in the BSR of the new-transmission user, wherein the other users refer to all online users in the serving cell to which the new-transmission user belongs but excluding users just getting online in the current TTI, retransmission users, new-transmission users already scheduled prior to scheduling this new-transmission user, and this new-transmission user itself; and when determining that the average rate of a new-transmission user is less than the GBR, a number of RBs for the new-transmission user is determined according to the value in the BSR of the new-transmission user.

Preferably, when determining that the average rate of the new-transmission user is greater than or equal to the GBR but less than or equal to the MBR, the method may further include:

when the BSR of the user is greater than the GBR, this user is added to a user list in which the number of RBs for the user is limited and the average rate of the user reaches the GBR; and if there are remaining RB resources after other users are all allocated with RB resources, the RB resources are allocated to the user in the user list of which a limited RB number has reached the GBR.

An apparatus for scheduling a GBR service based on QoS, and the apparatus includes a determining unit and a resource scheduling unit, wherein the determining unit is configured to determine a scheduling priority of an online user according to an average rate of a GBR service of the user in a current TTI; and the resource scheduling unit is configured to schedule the user in accordance with the determined priority and allocate RB resources to the user.

Preferably, the determining unit may be further configured to determine the scheduling priority of the online user according to a PF scheduling algorithm in conjunction with QoS of the GBR service of the user.

Preferably, the determining unit may be further configured to determine a scheduling priority FF of the user according to the following formula:

$$FF = FF_{PF} \cdot FF_{GBR}$$

where $$FF_{PF} = \frac{\sum_{i=1}^{N} TB(i)}{1 + Th_{His}}, \quad FF_{GBR} = e^{\frac{GBR \cdot (1 + ThresholdGBR)}{1 + Th_{His}}},$$

"·" represents a scalar multiplication, $Th_{His}$ represents an average rate of the GBR service in N TTIs selected prior to the current TTI, TB(i) represents TBs transmitted successfully in the N TTIs, ThresholdGBR represents a GBR reserved proportion set by a system, and GBR in the numerator of the index represents a guaranteed bit rate configured by the system.

Preferably, the determining unit may be further configured to determine $Th_{His}$ according to the following formula:

$$Th_{His} = \frac{\sum_{i=1}^{N}(TB\_1 \cdot ACK\_1 + TB\_2 \cdot ACK\_2 + \ldots + TB\_m \cdot ACK\_m)}{N},$$

where N represents a selected window length, and m represents the number of GBR service streams of a user in the N TTIs, wherein m is generally 1 or 2, TB_1 to TB_m represent TB Sizes scheduled once for respective GBR service streams 1 to m in the TTI, and ACK_1, ACK_2 and ACK_m take a value of 1 when a corresponding TB is transmitted successfully and a value of 0 when the corresponding TB fails to be transmitted.

Preferably, the resource scheduling unit may be further configured to:

schedule retransmission users in accordance with a priority order, wherein a number of RBs of each retransmission user depends on a retransmitted TB Size and is not limited by a GBR factor; and if there are remaining RB resources after all retransmission users are scheduled, schedule new-transmission users in accordance with the priority order and allocate multiple RBs to each new-transmission user according to QoS determined by the GBR service of each new-transmission user.

Preferably, the resource scheduling unit may be further configured to:

when determining that the average rate of a new-transmission user is greater than an MBR, do not schedule the new-transmission user;

when determining that the average rate of a new-transmission user is greater than or equal to the GBR but less than or equal to the MBR and further determining that there are other users with rates less than the GBR in a current cell, determine a number of RBs for the new-transmission user according to a smaller value of the GBR and a BSR of the new-transmission user; when determining that the average rates of the other users in the current cell are greater than or equal to the GBR, determine a number of RBs for the new-transmission user according to the value in the BSR of the new-transmission user, wherein the other users refer to all online users in the serving cell to which the new-transmission user belongs but excluding users just getting online in the current TTI, retransmission users, new-transmission users already scheduled prior to scheduling this new-transmission user, and this new-transmission user itself; and when determining that the average rate of a new-transmission user is less than the GBR, determine a number of RBs for a new-transmission user according to the value in the BSR of the new-transmission user.

Preferably, when determining that the average rate of the new-transmission user is greater than or equal to the GBR but less than or equal to the MBR, the resource scheduling unit may be further configured to, when the BSR of the user is greater than the GBR, add this user to a user list in which the number of RBs for the user is limited and the average rate of the user reaches the GBR; if there are remaining RB resources after other users are all allocated with RB resources, allocate the RB resources to the users in the user list of which a limited RB number has reached the GBR.

In the disclosure, according to the PF scheduling algorithm in conjunction with QoS of the GBR service of each user, the scheduling priority of each user is determined, so as to enable the service to satisfy the GBR rate as far as possible on the premise of guaranteeing scheduling fairness. With the scheduling method of the disclosure, the RB resources can be fully utilized, and the user rate which does not reach GBR is quickly improved to make as many users as possible to reach the GBR, so as to increase the number of satisfied users in system. For the case in which an MBR is greater than the GBR, on the basis that as many users as possible are made to reach the GBR, the rate of users can be further improved to increase the number of users with high rates.

DETAILED DESCRIPTION

Figure 1:
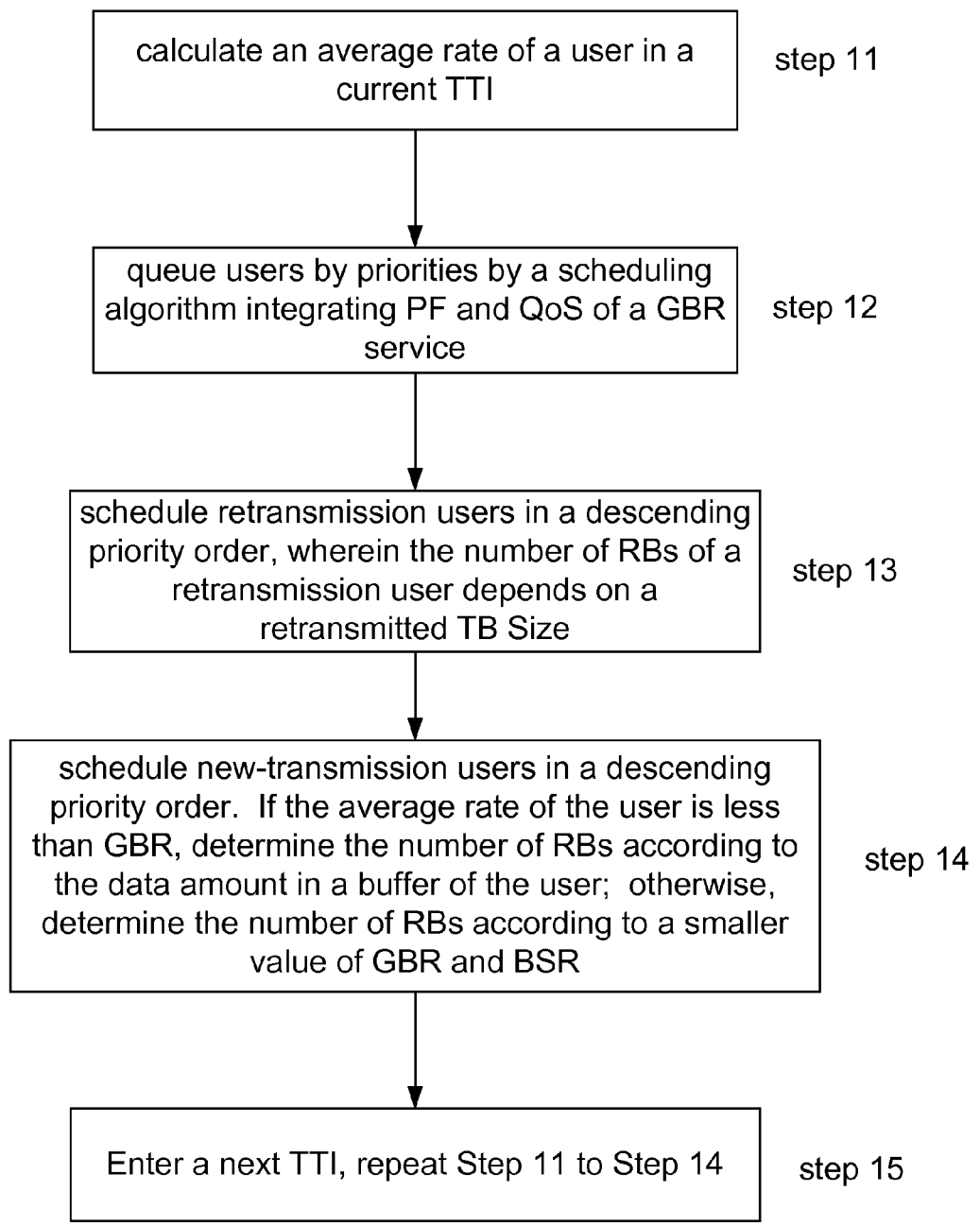
FIG. 1 shows a flowchart of a method for scheduling a GBR service based on QoS according to Embodiment 1 of the disclosure.

For a better understanding, technical schemes and advantages of the disclosure and embodiments are provided below to further illustrate the disclosure in detail by reference to accompanying drawings.

Two embodiments hereinafter are illustrated by taking a 10 MHz-bandwidth Long Term Evolution (LTE) downlink system of a macro eNodeB as an example. Basic parameters and parameters adopted by system simulation are shown in Table 1.

TABLE 1

| Parameter Items | Value |
| --- | --- |
| Drop number | 1 |
| Simulation TTI number per Drop | 1600TTI |
| Warmup TTI number | 500 |
| Networking mode | 3-sectorized Hexagonal grid |
| Site number | 7sites, Wrap around |
| ISD (site spacing) | 1000 m |
| Frequency multiplexing | 1 |
| Multi-antenna technology | RANK adaptation |
| BS transmit power | 46 dBm |
| BS antenna configuration | 2TX (10lamda) |
| BS noise coefficient | 5 dB |
| BS antenna gain | 17 dB |
| UE transmit power | 23 dBm |
| UE antenna configuration | 2 RX |
| UE noise coefficient | 9 dB |
| UE antenna gain | 0 dB |
| Antenna mode | Measured data for vertical pattern. Back loss = −25 dB for horizontal Back loss = −20 dB for vertical Back loss = −25 dB for whole pattern Angle of elevation calculated by a ratio of actual height difference to horizontal projection distance |
| UE distribution | Uniformly dropped in each cell |
| Carrier frequency band | 2.0 GHz |
| System bandwidth | 10M |
| Simulation scene | Dense urban |
| Large-Scale Fading | 3GPP M1225: PL = 128.1 + 37.6 log (d), d in km |
| Shadow correlation distance | 50 m |
| Shadow correlation coefficient between cells | 0.5 |
| Shadow correlation coefficient between sectors | 1 |
| Penetration Loss | 20 dB |
| User service model | NGMN service model |
| Scheduler | Fair Factor: $FF = FF_{PF} \cdot FF_{GBR}$ |

Based on a service model of a Next Generation Mobile Network (NGMN) technology development organization, a scene with great load is selected, wherein the size of a data packet of a user is set to be 0.16M, new data is inserted into a Buffer Status Report (BSR) according to the size of MBR in each TTI, thus, in this way, the user rate would not be greater than the MBR, provided that all users in the system have the same GBR service requirement. The essence of the technical scheme of the disclosure is further illustrated below in conjunction with specific embodiments.

Embodiment 1

This embodiment is designed for the condition that the MBR of a user is equal to the GBR, that is, for inserting new data into a BSR according to the size of GBR in each TTI.

When new data is inserted into the BSR according to the size of GBR in each TTI, once the user retransmits, the rate would be less than the GBR. Thus, in the condition of MBR=GBR, there would be many users having rates less than the GBR instantaneously. At this moment, a fast measure should be adopted: for the user having a rate less than the GBR, the number of RBs is determined according to a value in the BSR; for the user having a rate greater than or equal to the GBR, the number of RBs is determined by taking a smaller value of the GBR and the BSR.

FIG. 1 shows a flowchart of a method for scheduling a GBR service based on QoS according to Embodiment 1 of the disclosure; as shown in FIG. 1, the method for scheduling a GBR service based on QoS comprises the following steps:

Step 11: calculate an average history throughput rate of an online user (that is, an average rate of a user) in a system in a current TTI. The calculation formula is as follows:

$$Th_{His} = \frac{\sum_{i=1}^{N}(TB\_1 \cdot ACK\_1 + TB\_2 \cdot ACK\_2)}{N}$$

In the formula above, N represents a set window length and generally takes a value of 1024; however, the value can also be set according to the system requirement and the actual scheduling scene. This embodiment is illustrated by taking a user simultaneously having two GBR service flows for example; if a user has multiple GBR service flows, the formula above can also determine the average rate. TB_1 (the first flow) and TB_2 (the second flow) represent a TB Size scheduled once in the window time respectively; if no scheduling is performed, TB_1 and TB_2 take a value of 0. ACK_1 and ACK_2 represent Hybrid Automatic Repeat Request (HARQ) acknowledgment information about whether TB_1 and TB_2 are transmitted successfully received by an eNodeB (for a downlink); the ACK takes a value of 1 when a transmission is success, and takes a value of 0 when it fails.

Step 12: a base station queues each user terminal by a priority according to a scheduling algorithm.

The scheduling algorithm in Step 12 is an algorithm integrating the PF and the QoS of the GBR service, wherein a comprehensive priority (FF) of a user is as follows:

$$FF = FF_{PF} \cdot FF_{GBR}$$

where $FF_{PF}$ represents a fair factor calculated by a (general) PF algorithm (G-PF);

$$FF_{PF} = \frac{\sum_{i=1}^{N} TB(i)}{1 + HistoryThroughput},$$

where the numerator represents a TB Size transmitted successfully in N TTIs (the selected window length), the HistoryThroughput in the denominator represents the average history throughput rate of a user obtained in Step 11, and "·" represents scalar multiplication.

$FF_{GBR}$ represents a fair factor of the GBR scheduling.

$$FF_{GBR} = e^{\frac{GBR \cdot (1 + ThresholdGBR)}{1 + HistoryThroughput}},$$

where the GBR in the numerator of the index represents a guaranteed bit rate configured by a system, ThresholdGBR represents a GBR reserved proportion, which is equivalent to an fluctuation amplitude threshold of the GBR, for example, ThresholdGBR=10%; the HistoryThroughput in the denominator of the index represents the average history throughput rate of a user obtained in Step 11.

According to the calculation result in this step, users are sorted by priorities, wherein the user with a highest priority is queued in the most front of the queue.

Step 13: schedule a retransmission user according to the user priority obtained in Step 12, wherein the number of RBs of the retransmission user depends on the retransmitted TB Size and is not limited by a GBR factor.

Step 14: schedule a new-transmission user according to the user priority obtained in Step 12.

Step 14 may further include the following steps:

Step 141: determine whether the rate of the user obtained in Step 11 is less than the GBR, if yes, go to Step 142, otherwise, go to Step 143.

Step 142: if the average rate of the user is less than the GBR, determine the number of RBs according to the RB number $RB_{Rank}^{BSR}$ needed by the value in the BSR, and then take a smaller value of the $RB_{Rank}^{BSR}$ and the number of current remaining RBs.

That is, $RB_{Last} = \min(RB_{Rank}^{BSR}, RB_{Rest})$.

If the user adopts single-flow transmission, $$RB_{Rank1}^{BSR} = \frac{BSR + Head + CRC}{N_{SC}^{RB} \cdot N_{Sym}^{TTI} \cdot SE_1};$$

or if the user adopts double-flow transmission, $$RB_{Rank2}^{BSR} = \frac{BSR + 2 \cdot Head + 2 \cdot CRC}{N_{SC}^{RB} \cdot N_{Sym}^{TTI} \cdot (SE_1 + SE_2)}.$$

In the formula above, Head represents the bit number of MAC head and is 16 bits in an LTE system; CRC represents a length of Cyclic Redundancy Check (CRC) and is 24 bits in the LTE system; $N_{SC}^{RB}$ represents the number of sub-carriers contained in each RB and takes a value of 12 when the sub-carrier spacing is 15 KHz and a value of 24 when the sub-carrier spacing is 7.5 KHz; $N_{Sym}^{TTI}$ represents the number of available symbols in each TTI, and takes a value of 10 in a common CP and a value of 8 in an extended CP; $SE_1$ represents a spectrum efficiency corresponding to the CQI of a single flow or the CQI of a first flow (with a unit of bit/Symbol); $SE_2$ represents a spectrum efficiency corresponding to the CQI of a second flow of double flows, wherein the CQI is the wideband CQI reported by the user.

Step 143: if the average rate of the user is greater than or equal to the GBR, determine the number of RBs according to a smaller value $RB_{Rank}{}^{Min}$ of the GBR and the BSR and take a smaller value of the $RB_{Rank}{}^{Min}$ and the number of current remaining RBs.

That is, $RB_{Last} = \min(RB_{Rank}{}^{Min}, RB_{Rest})$.

If the user adopts single-flow transmission, $$RB_{Rank1}^{Min} = Ceil\left(\frac{\min(BSR, GBR \cdot TTI) \cdot EP \cdot Header + CRC}{N_{SC}^{RB} \cdot N_{Sym}^{TTI} \cdot SE_1}\right);$$

or

If the user adopts double-flow transmission, $$RB_{Rank2}^{Min} = Ceil\left(\frac{\min(BSR, GBR \cdot TTI) \cdot EP \cdot Header + 2 \cdot CRC}{N_{SC}^{RB} \cdot N_{Sym}^{TTI} \cdot (SE_1 + SE_2)}\right).$$

In the formula above, Ceil(·) represents a ceiling operation; min(·) represents an operation of taking a smaller one from two; BSR represents the bit number catched by a Dedicated Transmission Channel (DTCH); GBR represents a guaranteed bit rate of the GBR service (with a unit of kbps); EP represents a rate enhancement proportion (with a purpose of preventing in advance service rate reduction caused by error block); Header represents a proportion to be enhanced since RLC/PDCP has an overhead such as Head/Padding; TTI represents a duration of a TTI (here, it is 1 ms); $SE_2$ represents a spectrum efficiency of a second flow (corresponding to the CQI of the second GBR service flow).

Step 15: enter a next TTI, repeat Step 11 to Step 14.

Figure 3:
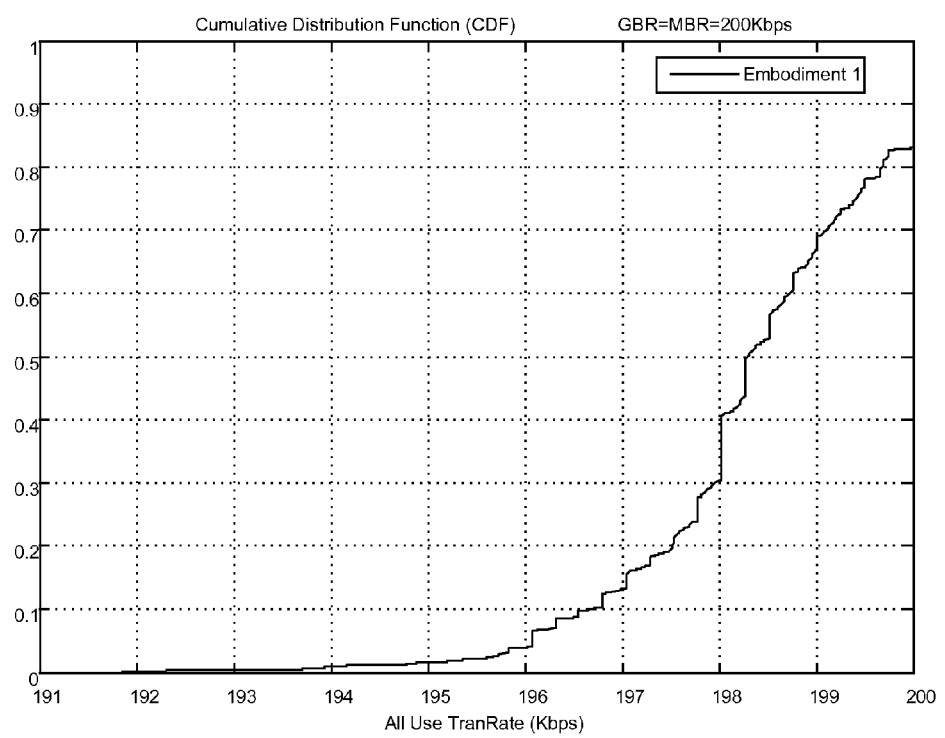
FIG. 3 shows a simulation diagram of both MBR and GBR being equal to 200 Kbps according to Embodiment 1 of the disclosure.
Figure 4:
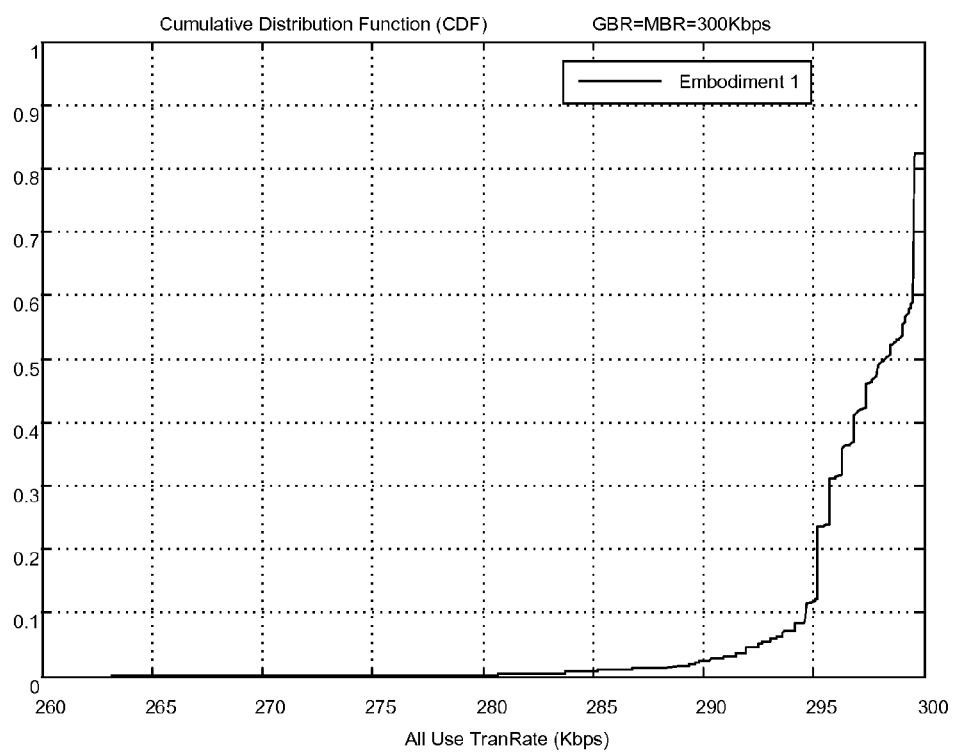
FIG. 4 shows a simulation diagram of both MBR and GBR being equal to 300 Kbps according to Embodiment 1 of the disclosure.

FIG. 3 shows a simulation diagram of both MBR and GBR being equal to 200 Kbps according to Embodiment 1 of the disclosure; FIG. 4 shows a simulation diagram of both MBR and GBR being equal to 300 Kbps according to Embodiment 1 of the disclosure. With reference to FIG. 3 and FIG. 4, in the scene of Embodiment 1, the simulation shows that the scheduling scheme for a GBR service in the disclosure can fully guarantee the GBR rate of users, especially of edge users. The simulation system in the disclosure is a commercially available LTE simulation system.

Embodiment 2

This embodiment is designed for the condition that the MBR of a user is greater than the GBR, that is, for inserting new data into a BSR according to the size of the MBR in each TTI.

Compared with Embodiment 1, the basic idea of Embodiment 2 is the same as that of Embodiment 1. That is, the number of RBs of users reaching the GBR rate is limited and the remaining RB resources are allocated to users not reaching the GBR rate. In this way, the user not reaching the GBR rate may have adequate RB resources to transmit more data, thus the transmission rate is improved to reach the GBR rate. The difference is that Embodiment 2 refines the users reaching the GBR rate with RB number being limited. On the basis of guaranteeing the GBR rate of edge users, the RB resources are fully utilized to further improve the user rate, so that more users can enjoy higher rate QoS on the basis of the users basically having the GBR rate.

Figure 2:
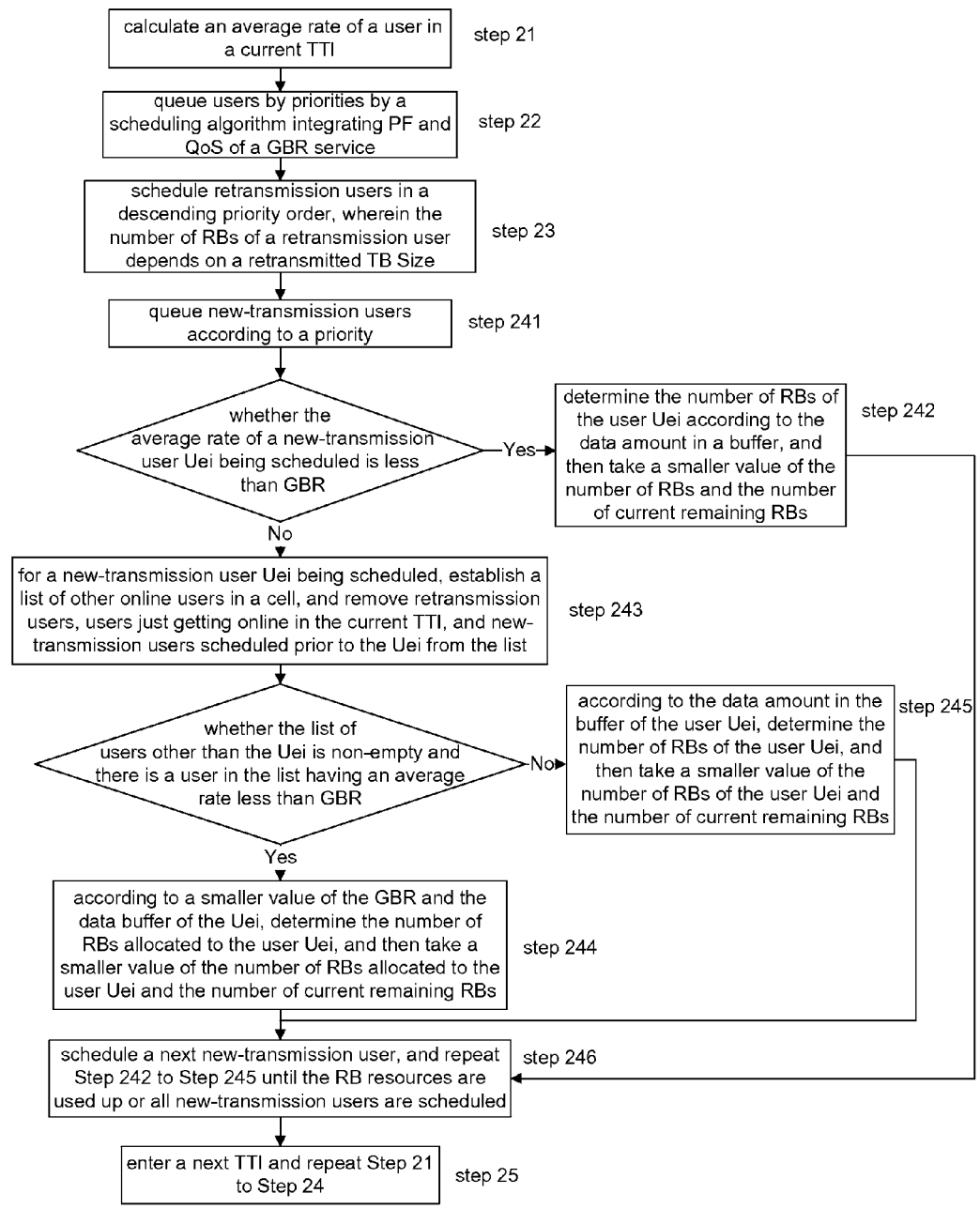
FIG. 2 shows a flowchart of a method for scheduling a GBR service based on QoS according to Embodiment 2 of the disclosure.

FIG. 2 shows a flowchart of a method for scheduling a GBR service based on QoS according to Embodiment 2 of the disclosure; as shown in FIG. 2, the method for scheduling a GBR service based on QoS comprises the following steps:

Step 21: calculate an average history throughput rate of an online user (that is, an average rate of a user) in a system in a current TTI. The calculation formula is the same as that in Step 11 in Embodiment 1 and the description thereof is omitted here.

Step 22: an eNodeB queues each user terminal by a priority according to a scheduling algorithm. The calculation formula of the user priority is the same as that in Step 12 in Embodiment 1 and the description thereof is omitted here.

Step 23: schedule a retransmission user according to the user priority obtained in Step 22, wherein the number of RBs of the retransmission user depends on the retransmitted TB Size and is not limited by a GBR factor.

Step 24: schedule a new-transmission user according to the user priority obtained in Step 22.

Step 24 may further comprise the following steps:

Step 241: queue a new-transmission user according to the user priority obtained in Step 22.

Step 242: for a new-transmission user Uei being scheduled, if the average rate of the user Uei is less than the GBR, it is determined that the number of RBs $RB_{Rank}{}^{BSR}$ according to the value in a BSR of the user Uei, and a smaller value of $RB_{Rank}{}^{BSR}$ and the number of current remaining RBs is taken. The calculation formula of $RB_{Rank}{}^{BSR}$ is the same as that in Step 142 in Embodiment 1. If the average rate of the user Uei is greater than or equal to the GBR, go to Step 243.

Step 243: for a new-transmission user Uei being scheduled, establish a list of other online users in a cell, and remove retransmission users, users just getting online in the current TTI, and new-transmission users scheduled prior to the Uei from the list. If the list of users other than the Uei is not empty and there is a user in the list having an average rate less than the GBR, go to Step 244, otherwise, go to Step 245.

Step 244: according to a smaller value $RB_{Rank}{}^{Min}$ of the required GBR and the BSR of the user Uei, determine the number of RBs allocated to the user Uei, and take a smaller value of the number of RBs and the number of remaining RBs. The calculation formula of the $RB_{Rank}{}^{Min}$ is the same as that in Step 143 in Embodiment 1. Then, go to Step 246.

Step 245: according to the value in the BSR of the user Uei, determine the number of RBs $RB_{Rank}{}^{BSR}$ allocated to the user Uei, and take a smaller value of $RB_{Rank}{}^{BSR}$ and the number of remaining RBs. The calculation formula of $RB_{Rank}{}^{BSR}$ is the same as that in Step 142 in Embodiment 1. Then, go to Step 246.

Step 246: schedule a next new-transmission user according to the priority of the new-transmission user obtained in Step 241, and repeat Step 242 to Step 245 until all the RB resources are used up or all new-transmission users are scheduled.

Step 25: enter a next TTI and repeat Step 21 to Step 24.

With reference to FIG. 3, FIG. 4, FIG. 5 and FIG. 6, in the scene of the two embodiments above, the simulation shows that the scheduling scheme for a GBR service in the disclosure can guarantee the GBR rate of users, especially of edge users. In the scene of MBR>GBR, on the basis of guaranteeing the GBR rate of edge users, the disclosure can further improve the average rate of center users.

Figure 5:
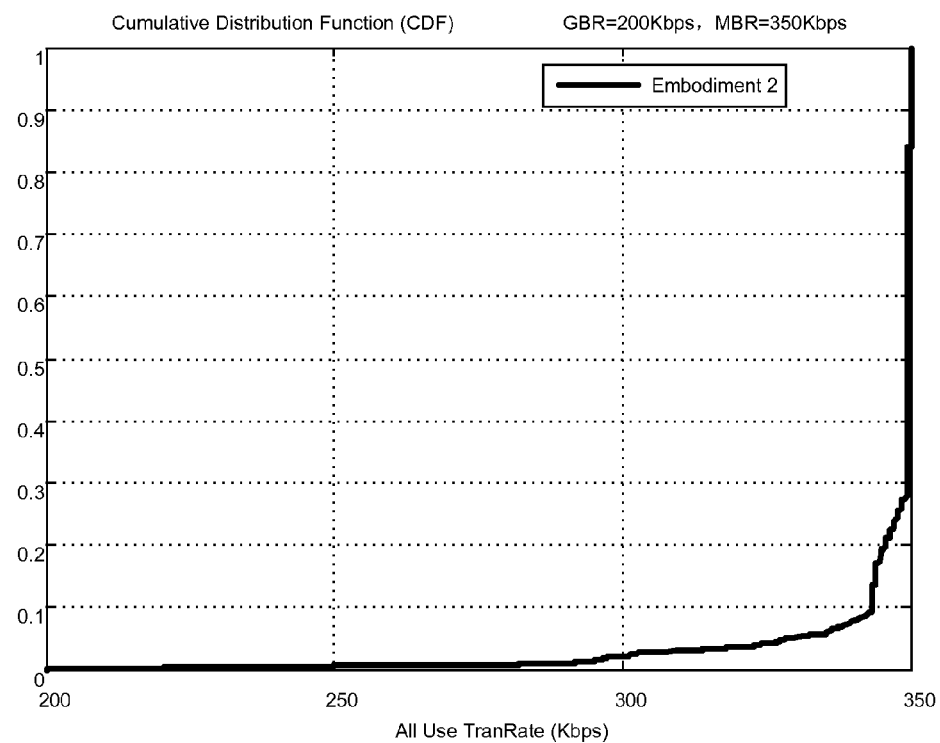
FIG. 5 shows a simulation diagram of MBR being 350 Kbps and GBR being 200 Kbps according to Embodiment 2 of the disclosure.
Figure 6:
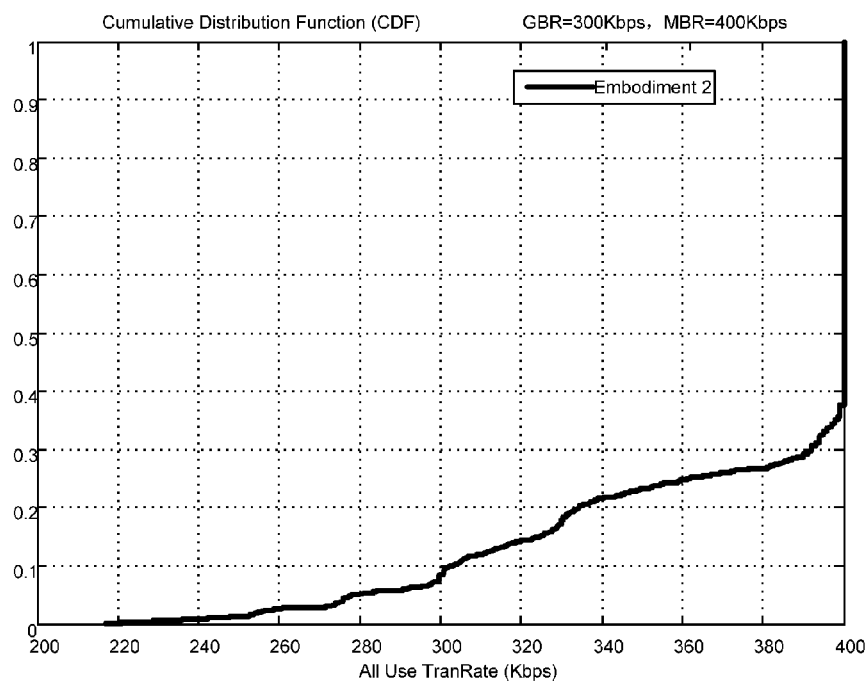
FIG. 6 shows a simulation diagram of MBR being 400 Kbps and GBR being 300 Kbps according to Embodiment 2 of the disclosure.

FIG. 5 shows a simulation diagram of MBR being 350 Kbps and GBR being 200 Kbps according to Embodiment 2 of the disclosure. FIG. 6 shows a simulation diagram of MBR being 400 Kbps and GBR being 300 Kbps according to Embodiment 2 of the disclosure. With reference to FIG. 5 and FIG. 6, the simulation shows that the scheduling scheme for a GBR service in the disclosure can guarantee the GBR rate of users, especially of edge users. In the scene of MBR>GBR, on the basis of guaranteeing the GBR rate of edge users, the disclosure can further improve the average rate of center users.

Figure 7:
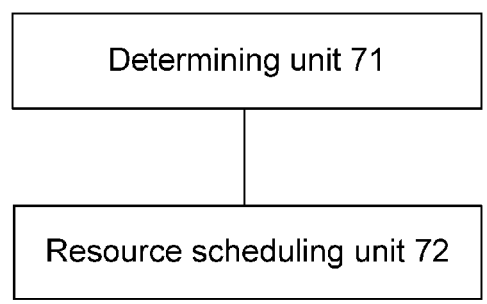
FIG. 7 shows a structure of an apparatus for scheduling a GBR service based on QoS according to the disclosure.

FIG. 7 shows a structure of an apparatus for scheduling a GBR service based on QoS according to the disclosure. As shown in FIG. 7, the apparatus for scheduling a GBR service based on QoS according to the disclosure comprises a determining unit 71 and a resource scheduling unit 72.

The determining unit 71 is configured to determine a scheduling priority of each user according to an average rate of a GBR service of each online user in a current TTI.

The resource scheduling unit 72 is configured to schedule the users in accordance with determined priorities and allocate RB resources to the users.

The determining unit 71 is further configured to determine the scheduling priority of each user according to a PF scheduling algorithm and in conjunction with QoS of the GBR service of each user.

Preferably, the determining unit 71 is further configured to determine a scheduling priority FF of a user according to following formula:

$$FF = FF_{PF} \cdot FF_{GBR}$$

where $$FF_{PF} = \frac{\sum_{i=1}^{N} TB(i)}{1 + Th_{His}}, \quad FF_{GBR} = e^{\frac{GBR \cdot (1+ThresholdGBR)}{1+Th_{His}}},$$

"·" represents a scalar multiplication; $Th_{His}$ represents an average rate of the GBR service in N TTIs selected prior to the current TTI; $TB(i)$ represents TBs transmitted successfully in the N TTIs; and ThresholdGBR represents a GBR reserved proportion set by a system.

The determining unit 71 is further configured to determine $Th_{His}$ according to the following formula:

$$Th_{His} = \frac{\sum_{i=1}^{N} (TB\_1 \cdot ACK\_1 + TB\_2 \cdot ACK\_2 + \ldots + TB\_m \cdot ACK\_m)}{N},$$

where N represents a selected window length; TB_1 to TB_m represent TB Sizes scheduled once for respective GBR service streams 1 to m in the TTI; and ACK_1, ACK_2 and ACK_m take a value of 1 when a corresponding TB is transmitted successfully and a value of 0 when the corresponding TB fails to be transmitted.

The resource scheduling unit 72 is further configured to:

schedule retransmission users in accordance with a priority order, wherein the number of RBs of a retransmission user depends on the retransmitted TB Size and is not limited by a GBR factor; and if there are RB resources left after all retransmission users are scheduled, schedule new-transmission users in accordance with a priority order and allocate a number of RBs to the new-transmission users according to the QoS determined by the GBR service of the new-transmission user.

The resource scheduling unit 72 is further configured to:

do not schedule a new-transmission user, when determining that the average rate of the new-transmission user is greater than an MBR;

determine a number of RBs for a new-transmission user according to a smaller value of the GBR and a BSR of the new-transmission user, when determining that the average rate of the new-transmission user is greater than or equal to the GBR but less than or equal to the MBR and further determining that there are other users with rates less than the GBR in the current cell; determine a number of RBs for the new-transmission user according to the value in the BSR of the new-transmission user, when determining that the average rates of the other users in the current cell are greater than or equal to the GBR; and determine a number of RBs for a new-transmission user according to the value in the BSR of the new-transmission user, when determining that the average rate of the new-transmission user is less than the GBR.

When determining that the average rate of the new-transmission user is greater than or equal to the GBR but less than or equal to the MBR, the resource scheduling unit 72 is further configured to add this user to a user list of which a limited RB number has reached the GBR, when the BSR of the user is greater than the GBR; and if RB resources are left after other users are all allocated with RB resources, allocate RB resources to the user in the user list of which a limited RB number has reached the GBR.

Those skilled in the art should understand that the apparatus for scheduling a GBR service based on QoS shown in FIG. 7 is designed for implementing the method for scheduling a GBR service based on QoS described above. The function of each processing unit included in the apparatus shown in FIG. 7 can be understood by reference to the description of Embodiment 1 and Embodiment 2, wherein the function of each processing unit can be implemented by a program running on a processor, or can be implemented by a specific logic circuit.

The above is only the preferred embodiments of the disclosure and is not intended to limit the protection scope of the disclosure.

What is claimed is:

1. A method for scheduling a Guaranteed Bit Rate (GBR) service based on Quality of Service (QoS), comprising:
   determining a scheduling priority of an online user according to an average rate of a GBR service of the user in a current Transmission Time Interval (TTI); and
   scheduling the user in accordance with the determined priority and allocating Resource Block (RB) resources to the user;
   wherein the scheduling the user in accordance with the determined priority and allocating the RB resources to the user comprises:
   scheduling retransmission users in accordance with a priority order, wherein a number of RBs of each retransmission user depends on a retransmitted TB Size and is not limited by a GBR factor; and
   scheduling new-transmission users in accordance with the priority order, and allocating RBs to each new-transmission user according to QoS determined by the GBR service of each new-transmission user, when there are remaining RB resources after all retransmission users are scheduled.

2. The method according to claim 1, wherein the determining the scheduling priority of the online user according to the average rate of the GBR service of the user in the current TTI comprises:

determining the scheduling priority of the user according to a Proportional Fair (PF) scheduling algorithm in conjunction with QoS of the GBR service of the user.

3. The method according to claim 2, wherein the determining the scheduling priority of the user according to the PF scheduling algorithm in conjunction with QoS of the GBR service of the user is determining a scheduling priority Fair Factor (FF) of the user according to a following formula:

$$FF = FF_{PF} \cdot FF_{GBR}$$

where $$FF_{PF} = \frac{\sum_{i=1}^{N} TB(i)}{1 + Th_{His}}, \quad FF_{GBR} = e^{\frac{GBR \cdot (1 + ThresholdGBR)}{1 + Th_{His}}},$$

"·" represents a scalar multiplication, $Th_{His}$ represents an average rate of the GBR service in N TTIs selected prior to the current TTI, TB(i) represents Transmission Blocks (TBs) transmitted successfully in the N TTIs, ThresholdGBR represents a GBR reserved proportion set by a system, and GBR in the numerator of the index represents a guaranteed bit rate configured by the system.

4. The method according to claim 3, wherein $Th_{His}$ is determined according to a following formula:

$$Th_{His} = \frac{\sum_{i=1}^{N}(TB\_1 \cdot ACK\_1 + TB\_2 \cdot ACK\_2 + \ldots + TB\_m \cdot ACK\_m)}{N},$$

where N represents a selected window length, m represents a number of GBR service streams of the user in the N TTIs, TB_1 to TB_m represent TB Sizes scheduled once for respective GBR service streams 1 to m in the TTI, and ACK_1, ACK_2 and ACK_m take a value of 1 when a corresponding TB is transmitted successfully and a value of 0 when the corresponding TB fails to be transmitted.

5. The method according to claim 1, wherein the allocating RBs to each new-transmission user according to the QoS determined by the GBR service of each new-transmission user comprises:
not scheduling a new-transmission user, when determining that the average rate of the new-transmission user is greater than a Maximum Bit Rate (MBR);
determining a number of RBs for a new-transmission user according to a smaller value of the GBR and a Buffer Status Report (BSR) of the new-transmission user, when determining that the average rate of the new-transmission user is greater than or equal to the GBR but less than or equal to the MBR and further determining that there are other users with rates less than the GBR in a current cell; determining a number of RBs for the new-transmission user according to a value in the BSR of the new-transmission user, when determining that the average rates of the other users in the current cell are greater than or equal to the GBR; wherein the other users refer to all online users in the serving cell to which the new-transmission user belongs but excluding users just getting online in the current TTI, retransmission users, new-transmission users already scheduled prior to scheduling this new-transmission user, and this new-transmission user itself; and determining a number of RBs for a new-transmission user according to the value in the BSR of the new-transmission user, when determining that the average rate of the new-transmission user is less than the GBR.

6. The method according to claim 5, further comprising:
when determining that the average rate of the new-transmission user is greater than or equal to the GBR but less than or equal to the MBR:
adding this user to a user list in which the number of RBs for the user is limited and the average rate of the user reaches the GBR, when the BSR of the user is greater than the GBR; and
allocating RB resources to the user in the user list of which the limited RB number has reached the GBR, when there are remaining RB resources after other users are all allocated with RB resources.

7. An apparatus for scheduling a Guaranteed Bit Rate (GBR) service based on Quality of Service (QoS), comprising a determining unit and a resource scheduling unit, wherein
the determining unit is configured to determine a scheduling priority of an online user according to an average rate of a GBR service of the user in a current Transmission Time Interval (TTI); and
the resource scheduling unit is configured to schedule the user in accordance with the determined priority and allocate Resource Block (RB) resources to the user;
wherein the resource scheduling unit is further configured to:
schedule retransmission users in accordance with a priority order, wherein a number of RBs of each retransmission user depends on a retransmitted TB Size and is not limited by a GBR factor; and
schedule new-transmission users in accordance with the priority order, and allocate RBs to each new-transmission user according to QoS determined by the GBR service of each new-transmission user, when there are remaining RB resources after all retransmission users are scheduled.

8. The apparatus according to claim 7, wherein the determining unit is further configured to determine the scheduling priority of the user according to a Proportional Fair (PF) scheduling algorithm in conjunction with QoS of the GBR service of the user.

9. The apparatus according to claim 8, wherein the determining unit is further configured to determine a scheduling priority Fair Factor (FF) of the user according to a following formula:

$$FF = FF_{PF} \cdot FF_{GBR}$$

where $$FF_{PF} = \frac{\sum_{i=1}^{N} TB(i)}{1 + Th_{His}}, \quad FF_{GBR} = e^{\frac{GBR \cdot (1 + ThresholdGBR)}{1 + Th_{His}}},$$

"·" represents a scalar multiplication, $Th_{His}$ represents an average rate of the GBR service in N TTIs selected prior to the current TTI, TB(i) represents Transmission Blocks (TBs) transmitted successfully in the N TTIs, ThresholdGBR represents a GBR reserved proportion set by a system, and GBR in the numerator of the index represents a guaranteed bit rate configured by the system.

10. The apparatus according to claim 9, wherein the determining unit is further configured to determine $Th_{His}$ according to a following formula:

$$Th_{His} = \frac{\sum_{i=1}^{N}(TB\_1 \cdot ACK\_1 + TB\_2 \cdot ACK\_2 + \ldots + TB\_m \cdot ACK\_m)}{N},$$

where N represents a selected window length, m represents a number of GBR service streams of the user in the N TTIs, TB_1 to TB_m represent TB Sizes scheduled once of respective GBR service streams 1 to m in the TTI, and ACK_1, ACK_2 and ACK_m take a value of 1 when a corresponding TB is transmitted successfully and a value of 0 when the corresponding TB fails to be transmitted.

11. The apparatus according to claim 7, wherein the resource scheduling unit is further configured to:

not schedule a new-transmission user, when determining that the average rate of the new-transmission user is greater than a Maximum Bit Rate (MBR);

determine a number of RBs for a new-transmission user according to a smaller value of the GBR and a Buffer Status Report (BSR) of the new-transmission user, when determining that the average rate of the new-transmission user is greater than or equal to the GBR but less than or equal to the MBR and further determining that there are other users with rates less than the GBR in a current cell; determine a number of RBs for the new-transmission user according to a value in the BSR of the new-transmission user, when determining that the average rates of the other users in the current cell are greater than or equal to the GBR; wherein the other users refer to all online users in the serving cell to which the new-transmission user belongs but excluding users just getting online in the current TTI, retransmission users, new-transmission users already scheduled prior to scheduling this new-transmission user, and this new-transmission user itself; and determine a number of RBs for a new-transmission user according to the value in the BSR of the new-transmission user, when determining that the average rate of the new-transmission user is less than the GBR.

12. The apparatus according to claim 11, wherein the resource scheduling unit is further configured to: when determining that the average rate of the new-transmission user is greater than or equal to the GBR but less than or equal to the MBR, add this user to a user list in which the number of RBs for the user is limited and the average rate of the user reaches the GBR, when the BSR of the user is greater than the GBR; and allocate RB resources to the user in the user list of which a limited RB number has reached the GBR, when there are remaining RB resources after other users are all allocated with RB resources.

* * * * *